United States Patent [19]

Lucienne

[11] Patent Number: 5,732,604
[45] Date of Patent: Mar. 31, 1998

[54] DAMPED FLYWHEEL, WITH A PLAIN BEARING ESPECIALLY FOR A MOTOR VEHICLE

[75] Inventor: Philippe Lucienne, Aumont en Halatte, France

[73] Assignee: Valeo, Paris, Cedex, France

[21] Appl. No.: 481,380

[22] PCT Filed: Nov. 15, 1995

[86] PCT No.: PCT/FR94/01333

§ 371 Date: Jul. 13, 1995

§ 102(e) Date: Jul. 13, 1995

[87] PCT Pub. No.: WO95/14181

PCT Pub. Date: May 26, 1995

[30] Foreign Application Priority Data

Nov. 15, 1993 [FR] France ................ 93 13582

[51] Int. Cl.[6] ................................... F16F 15/134
[52] U.S. Cl. .................... 74/574; 192/110 B; 192/204
[58] Field of Search ............... 74/574; 192/204, 192/110 B, 70.17; 464/68

[56] References Cited

U.S. PATENT DOCUMENTS

| | | |
|---|---|---|
| 3,207,000 | 9/1965 | White . |
| 4,274,524 | 6/1981 | Nakane .................. 74/574 X |
| 5,069,321 | 12/1991 | Reik et al. .................. 74/574 X |
| 5,229,198 | 7/1993 | Schroeder . |

FOREIGN PATENT DOCUMENTS

| | | |
|---|---|---|
| 0060725 | 9/1982 | European Pat. Off. . |
| 0168869 | 1/1986 | European Pat. Off. . |
| 0509875 | 10/1992 | European Pat. Off. . |
| 2554891 | 5/1985 | France . |
| 2576357 | 7/1986 | France . |
| 2675517 | 10/1992 | France . |
| 3436012 | 4/1986 | Germany . |
| 3502229 | 7/1986 | Germany . |
| 2-158690 | 6/1990 | Japan . |

*Primary Examiner*—Charles A. Marmor
*Assistant Examiner*—Mary Ann Battista
*Attorney, Agent, or Firm*—Longacre & White

[57] ABSTRACT

The damped flywheel comprises two coaxial masses (1, 2) which are mounted for rotation of one with respect to the other against a torsion damper device (3), with one of the masses comprising a central nose (4, 40) projecting axially and penetrating into a central aperture (5, 50, 51) of the other mass. With support member(s) (6) being interposed between the said nose and the said aperture. These member(s) (6) comprise at least one plain bearing (70, 62 to 66) in the form of a hard, semi-crystalline polyetheretherketone material such as ARLON, for the rotary mounting of the mass having the central aperture (5, 50, 51) on the mass having the central nose (4, 40).

2 Claims, 3 Drawing Sheets

DAMPED FLYWHEEL, WITH A PLAIN BEARING ESPECIALLY FOR A MOTOR VEHICLE

BACKGROUND OF THE INVENTION

1. Field of the Invention

The present invention relates to damped flywheels, especially for motor vehicles, of the kind generally comprising two coaxial masses mounted for rotation of one with respect to the other against a torsion damper device, with one of the masses comprising a central nose projecting axially and penetrating into a central aperture of the other mass, with support means being interposed between the said nose and the said aperture for rotatable mounting of the mass having the central aperture.

2. Description of Related Art

Such a damped flywheel is described in the documents FR-A-2 554 891 and FR-A-2 576 357.

Conventionally, the support means consist of a ball bearing, which increases the selling price of the damped flywheel.

This is all the more so since this bearing must withstand temperatures of the order of 200° C.

In this connection, in a motor vehicle, one of the masses comprises a plate which constitutes the reaction plate of a clutch, which can reach not inconsiderable temperatures under severe working conditions.

In addition, this bearing is usually lubricated, so that the grease which it contains can escape and therefore contaminate the reaction plate and/or the friction means which conveniotonally forms part of the torsion damper device, so that the performance and useful life of the damped flywheel are reduced.

Finally, the rolling bearing can seize

In order to overcome these drawbacks, the use of plain bearings can be considered as described in the above mentioned documents, but other problems do arise in a damped flywheel, in particular problems of lubricating the plain bearings, as well as those of abrasion resistance (due to oscillating movements of the damped flywheel) and temperature resistance.

In addition, corrosion problems can arise, especially when the vehicle is stationary for a long time. All of this results in the fact that these plain bearings have not been produced industrially for damped flywheels.

Furthermore, it is desirable to have support means that have as low a coefficient of friction as possible.

SUMMARY OF THE INVENTION

An object of the present invention is to mitigate these drawbacks, and accordingly to provide a novel damped flywheel which does not have a ball bearing, and which does have support means which are highly resistant to abrasion and temperature, and which have a low coefficient of friction, while having low sensitivity to corrosion.

In accordance with the invention, a damped flywheel of the type described above is characterised in that the support means comprise at least one plain bearing in the form of a semi-crystalline, hard material of polyetheretherketone such as "ARLON", for rotary mounting of the mass having the central aperture, on the mass having the central nose.

Thanks to the invention, the damped flywheel has support means which are highly resistant to abrasion and which have a low coefficient of friction.

In addition, this type of bearing is stable at the temperatures which may be attained by the damped flywheel.

Furthermore, its thickness is less than that of a rolling bearing.

This low thickness enables the reaction plate mentioned above to be lengthened so that evacuation of heat is improved.

In addition, it is possible to avoid the use of a nonstandard central nose and reaction plate of the damped flywheel.

To this end, it is sufficient to employ at least one ring which partly replaces the usual rolling bearing.

In general terms, the bearing in accordance with the invention is inexpensive, and in particular it enables the selling price of the damped flywheel to be reduced, while increasing the useful life of the latter and its reliability. No contamination of the reaction plate and/or of the friction means is possible, due to the fact that the bearing is of the dry friction type.

In addition, the bearing is an excellent electrical insulator, and is highly resistant to flaking and plastic flow. It also has good fatigue resistance. It withstands high loads and has good stress resistance.

The said bearing has generally the same properties as an amorphous diamond carbon coating which is also referred to in the literature as "pseudo diamond carbon". This coating is approximately amorphous, and contains carbon with a small proportion of hydrogen. For more detail, reference should be made to the document FR-A-2 675 517, which describes a method in which a carbonated gas is introduced with the aid of a valve into a chamber which has been previously evacuated by means of a pump.

After this introduction, an electrical discharge is effected using a high frequency generator which causes the carbonated gas to become ionised, in such a way that the atoms partially lose their electrons with formation of a plasma. The metallic support contained in the above mentioned chamber, and serving as a support for the component to be coated, for example the nose of the damped flywheel, then becomes negatively charged, attracting the positive ions present in the plasma, which gives rise to the amorphous carbon coating.

Thus, the bearing means, in accordance with one feature, may comprise the above mentioned plain bearing, for example of "ARLON", and also a coating of amorphous diamond carbon.

In this way, a damped flywheel is obtained with support means which, as described above, are highly resistant to abrasion and corrosion, and which have good resistance to peeling and plastic flow.

The following description illustrates the invention with reference to the attached drawings, in which:

DETAILED DESCRIPTION OF PREFERRED EMBODIMENTS

Figure 1:
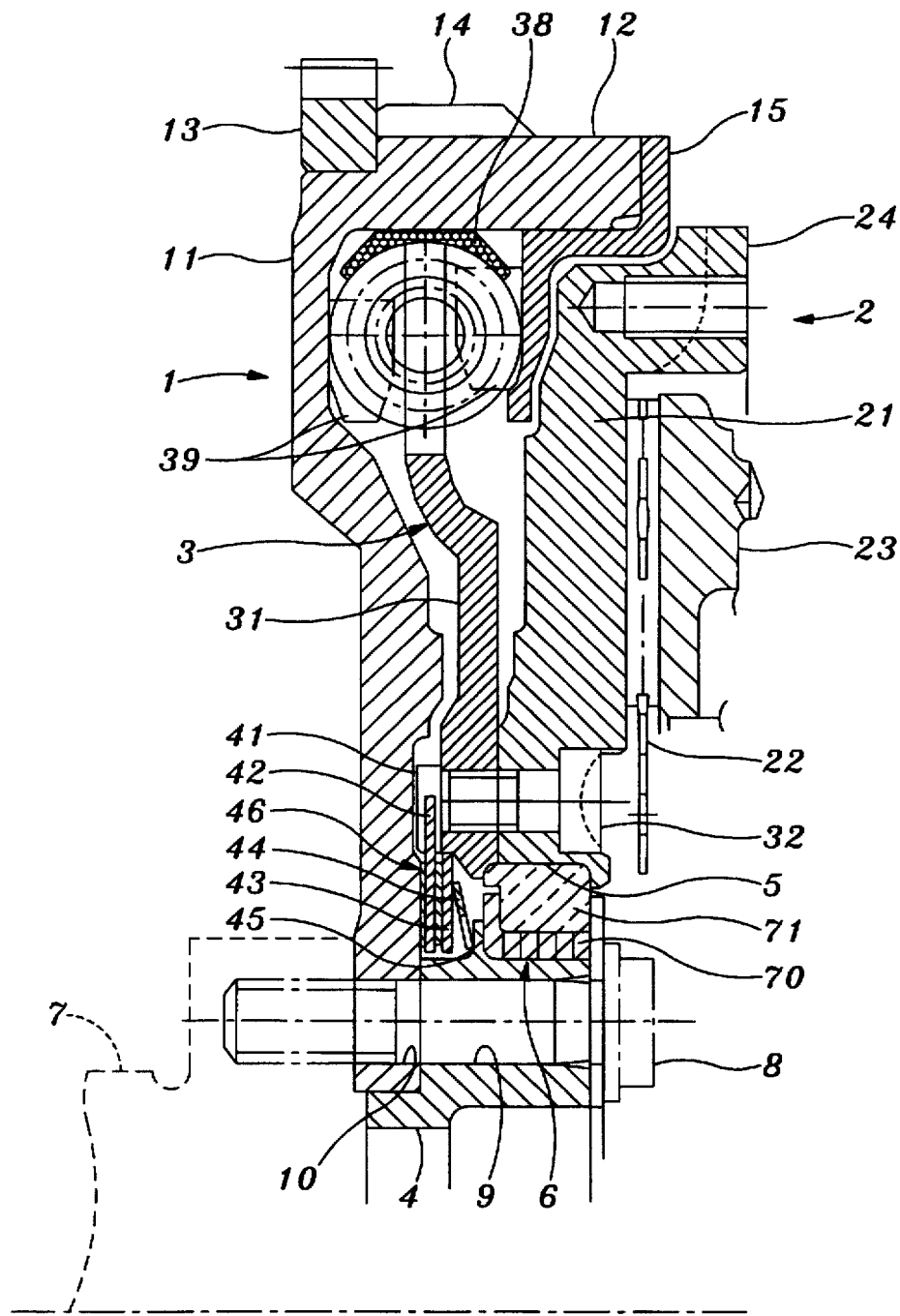
FIG. 1 is a half view in axial cross section of a damped flywheel in accordance with the invention.

The drawings show a damped flywheel, commonly referred to as a double damped flywheel, for a motor vehicle, being of the kind comprising two coaxial masses 1, 2 which are mounted for rotation of one with respect to the other against a torsion damper device 3, with one of the masses comprising a central nose 4 which projects axially and which penetrates into a central aperture 5 of the other mass, with support means 6 being interposed between the said nose 4 and the said aperture 5 for rotary mounting of the mass having the central aperture 5.

In the known way, the damped flywheel absorbs the vibrations which arise along the whole length of the drive train which constitutes a transmission, this drive train being that which, in a motor vehicle, goes from the internal combustion engine to the road wheels.

More precisely, in this example the first mass, or input mass, 1 is adapted to be mounted on the crankshaft 7 of the engine for rotation with the latter, while the second mass or output mass 2 is arranged to be mounted on the input shaft of the gearbox for rotation therewith.

The first mass 1 accordingly receives the engine torque, while the second mass 2 transmits the torque to the input shaft of the gearbox.

Here it is the first mass 1 that includes the central nose 4, while the second mass 2 has the central aperture 5.

The mass 1 is fixed to the crankshaft 7 by means of a plurality of studs 8, each of which passes through holes 9 and 10 which are formed, in line with each other, in the nose 4 and in a transverse plate 11, respectively. As can be seen in FIG. 1, the nose 4 centres the plate 11, while the studs 8 assemble the plate 11 and the nose 5 together.

The plate 11 carries at its outer periphery an axially oriented spacing crown 12, which in this example is integral with the plate 11. The crown 12 may of course be secured on the plate 11, for example by riveting or seaming.

The crown 12 carries a starter crown 13 which is arranged to be driven by the starter of the vehicle, together with ignition markers 14 in the form of recesses (FIG. 2) or bosses (not shown).

A sheet metal member 15 having a crooked profile matches the profile of the crown 12, and is located at the free end of the latter. The member 15 is fixed to the crown 12 by welding, and has at its inner periphery a portion in the form of a transverse plate which is directed towards the axis of the assembly. The second mass 2 includes a plate 21 which constitutes the reaction plate of a conventional clutch, of which part of the friction disc, having friction liners, can be seen at 22, while part of its pressure plate can be seen at 23. It is on the peripheral flange 24 of the plate 21 that the cover plate (not shown) of the clutch is fixed, with a diaphragm (not shown) being interposed between the cover plate and the pressure plate.

For further details, reference should be made to FIG. 1 of the documents FR-A-2 554 891 and U.S. Pat. No. 4,729,465, remembering that the clutch is normally engaged, with the disc 22 being clamped under the action of the diaphragm between the plates 21, 23.

The disc 22 has at its inner periphery a hub (not shown), which is mounted on the input shaft of the gearbox for rotation with it, and the second mass is thus mounted, by means of the clutch, on the said input shaft for rotation with the latter.

The plate 21 has at its inner periphery a bore which constitutes the above mentioned central aperture 5.

A damper plate 31 is attached by means of screws 32 on the reaction plate 21, at the inner periphery of the latter radially inwardly of the friction liners of the disc 21.

Figure 2:
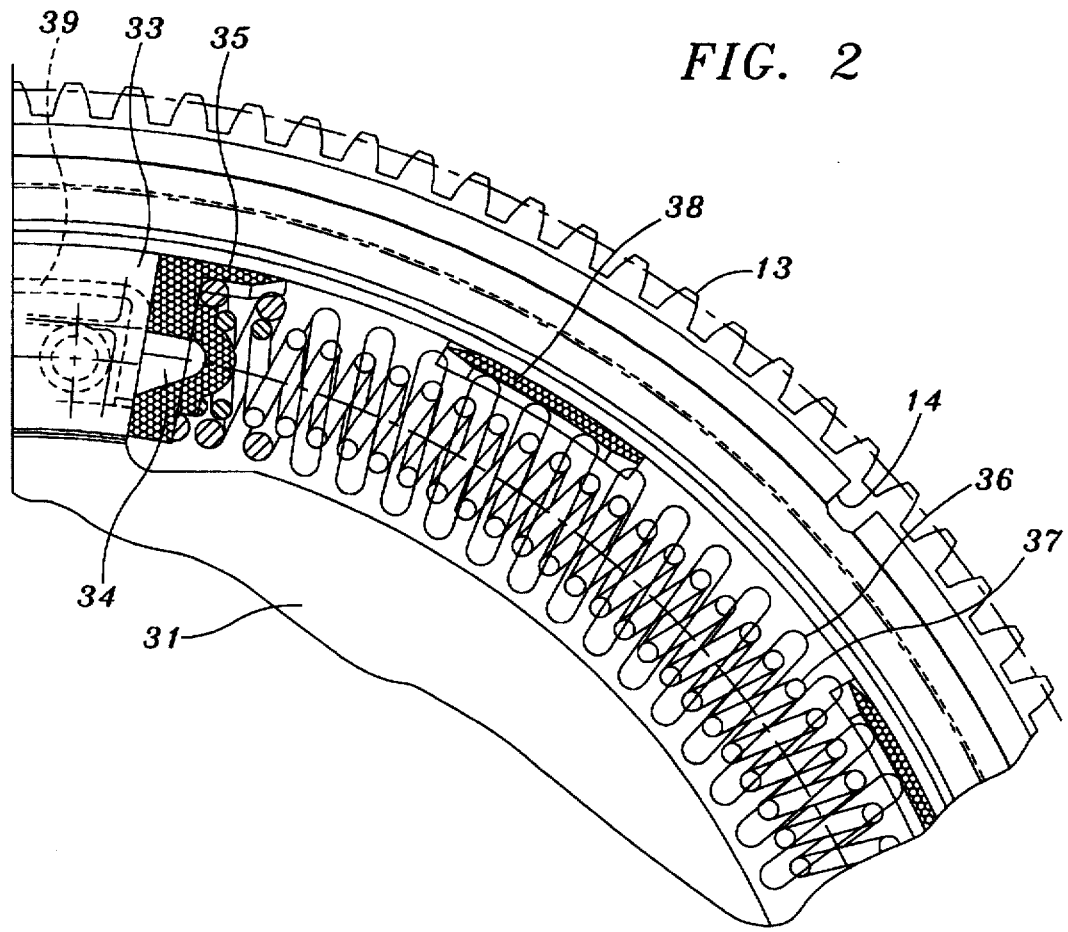
FIG. 2 is a partial view seen in the direction of the arrow 2 in FIG. 1, in which the second mass and the sheet metal member which masks the springs have been omitted.

The damper plate 31 has at its outer periphery a plurality of projecting radial arms 33, one of which can be seen in FIG. 2.

Each arm 33 has circumferential fingers 34, each of which penetrates into a recess of a thrust cup 35 (FIG. 2). Concentric coil springs 36, 37 are interposed between two consecutive arms 33, with cups 35 being interposed between the circumferential ends of the springs 36, 37 and the arms 33.

The said arms 33 penetrate into the cavity which is defined by the member 15, the crown 12 and the plate 11.

The plate 11 and the member 15 carry blocks 39 which are riveted to them, and which are in facing relationship to the arms 33, for abutment thereon of the circumferentially acting springs 36, 37 via the thrust cups 35. Thus the springs 36, 37 may be greased, and grease is provided in the above mentioned cavity.

Instead of blocks, the member 15 and the plate 11 may of course be formed with pressed portions for engagement with the springs 36, 37. It will be noted that the outer springs 36 carry pads 38 which are mounted on a turn of the spring 36, the said pads being in frictional engagement against the inner periphery of the crown 12.

The members 31, 33, 35, 36, 37, 38, 39 are part of the torsion damping device 3 mentioned above, which is interposed mechanically between the two masses. Thus, in a manner known per se, during relative angular displacement between the two masses 1, 2, the springs 36, 37 are compressed. The torsion damper device 3 also includes an axially acting friction means 46 located at the outer periphery of the nose 4, which in this example is of metal and of tubular form.

This friction means 46 comprises a friction ring 42 adapted to mesh with rivets 41 fixed to the damper plate 31, a thrust ring 43 mounted on the nose 4 for rotation with the nose, and an axially acting resilient ring 44, which in this example is a Belleville ring and which bears on the ring 43 and on a shoulder 45, which is fixed to the nose 4 and is, in this example, integral with the nose 4. In this way, the ring 42 is gripped between the ring 43 and the plate 11 under the action of the resilient ring 44, and friction is set up, in the manner known per se, during the relative movement between the two masses, with the ring 42 being forced by the rivets 41 to be displaced frictionally with respect to the plate 11 and ring 43, which is located on the nose 4 by means of lugs which are engaged in grooves of the nose 4.

The reaction plate 21, which is conventionally a casting, becomes heated. In this connection, each time the clutch is engaged, the friction liners of the disc 22 rub against the plate 21, which may accordingly reach temperatures of the order of 200° C. in the region of the support means 6.

In this connection, and in order to eliminate the ball bearing which is conventionally interposed between the two masses of the damped flywheel, with a view to reducing the cost of the damped flywheel, the support means are characterised in that they include at least one plain bearing in the form of a semi-crystalline, hard material of polyetheretherketone, such as "ARLON", for rotary mounting of the mass having the central aperture 5 on the mass having the central nose 4.

The said bearing is easy to make, and in some cases it enables the maximum number of components of the damper to be conserved.

Thus, in FIGS. 1 and 2 the reaction plate 21 and the tubular nose 4 are of a standard type.

The conventional rolling bearing is replaced by two coaxial rings 70, 71, one of which, for example the ring 70, consists of a plain bearing in accordance with the invention, which avoids any pollution of the plate 21 and/or the friction means 46, because it is of the dry type.

The central aperture 5 in the plate 21 is accordingly cylindrical. Thus, the inner ring 70 is force-fitted on the cylindrical outer periphery of the tubular nose 4, being located axially by the shoulder 45 and by a thrust ring 81 for the studs 8, which is interposed between the free end of the nose 4 and the head of the studs 8.

The outer ring 71 is force-fitted into the cylindrical and shouldered internal bore 5 of the plate 21, being located axially by the said shoulder which is part of the reaction plate 21 at its inner periphery on the side opposite to the damper plate 31, and by a shoulder of the said damper plate 31.

Thus the rings 70, 71 are fixed to the nose 4 and to the plate 21 respectively.

The ring 71 in this example is of wear-resistant treated steel, while the ring 70 is of "ARLON."

The ring 70 has a collar portion at its end which is adjacent to the shoulder 45, while the ring 71 has, level with it, a recess for accommodating the said collar portion.

The shouldered ring 70 thus has an L-shaped cross section, and is made by injection moulding, which may be followed by machining.

Figure 3:
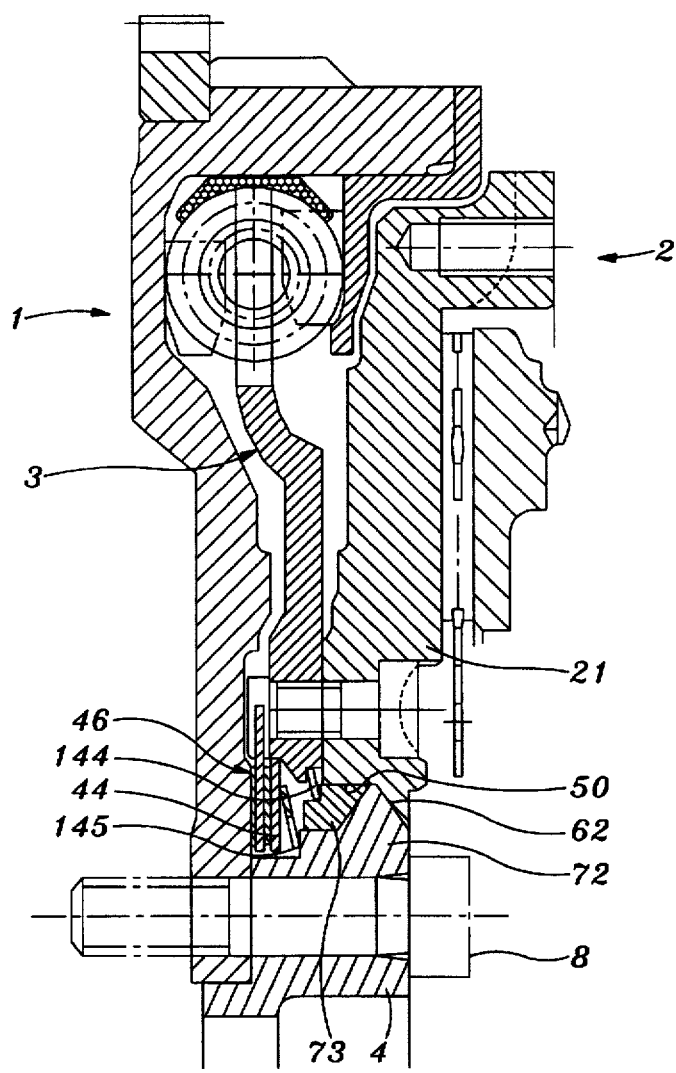
FIG. 3 is a view similar to FIG. 1 for another embodiment.

In FIG. 3, the nose 4 has at its outer periphery, and in facing relationship with the central aperture 50 of the plate 21, in the region of its free end, an annular radial projection 72 of pointed form, with two inclined surfaces defining a V-shaped cross section.

The central aperture 50 of the plate 21 has a cylindrical portion followed by an inclined portion, which defines an inclined face at the inner periphery of the plate 21.

The cylindrical portion is provided for the purpose of centering a shouldered cylindrical ring 73 of "ARLON", which is interposed radially between the outer periphery of the nose 4 and the inner periphery of the bore 50.

An axially acting resilient ring 144, which in this example is a Belleville ring, bears on the shoulder of the ring 73 and on a shoulder of the damper plate 31, which is formed in a rebate formed in the inner periphery of the damper plate 31 in facing relationship to the plate 21.

The ring 144 biasses the ring 73 towards the projection 72. This ring 73, being here of "ARLON" in accordance with the invention, has a complementary inclined surface facing towards the projection 72.

A coating 62 of amorphous diamond carbon is provided on the other inclined surface of the projection 72. This coating is preferably deposited on the nose 4, and is accordingly interposed between the internal bore of the reaction plate 21 (i.e. the inclined face of the latter) and the appropriate surface of the projection 72.

In a modification, it is of course possible to deposit the coating 62 on the inclined face of the plate 21.

Thus the support means comprise partly the coating 62 and partly the ring 73.

As will have been understood, the inclined faces of the ring 73 and plate 21 together define an annular recess for receiving the complementary, triangular projection 72.

The resilient ring 144 takes up the clearances, the ring 73 being abutted against the projection 72.

A cylindrical portion extends the projection 72 towards the plate 11.

This cylindrical portion is delimited by a shoulder 145 which is formed by virtue of a change in diameter of the nose, and it is on this shoulder that the resilient ring 44 of the friction means 46 engages.

It will be noted that the above mentioned cylindrical portion constitutes a portion for centring the ring 73, and surrounds the latter.

The "ARLON" support in accordance with the invention can of course be divided into two half rings.

Figure 4:
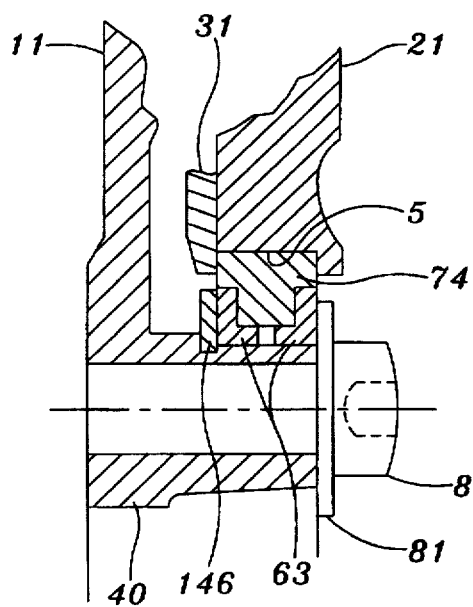
FIGS. 4 to 7 are simplified views showing the central part of the damped flywheel in further embodiments.

Thus, in FIG. 4, a single ring 74 is force-fitted into the cylindrical central aperture 5, being located axially by the damper plate 31 in the same way as in FIG. 1.

In this Figure, the nose 40 is integral with the metallic plate 11, and a circlip 146 fitted in a groove of the nose 40 replaces the shoulder 45 of FIG. 1.

The ring 74 is therefore fixed to the plate 21, and is fitted at its inner periphery on a bearing 63 of "ARLON", fitted over the outer periphery of the nose Accordingly, this bearing has a U-shaped cross section, defined by the two half rings of L-shaped cross section which are comprised by the bearing 63. The ring 74, which in this example is of treated steel, is accordingly coated with a plain bearing in accordance with the invention, interposed radially between the nose 40 and the ring 74, which is recessed for the fitting of the two half rings of the bearing 63.

The structures can of course be reversed. Thus, in FIG. 5, the ring 174 is force-fitted on to the nose 40, being located axially by the shoulder 146 and directly by the head of the stud 8.

It is the outer periphery of the ring 174 that is coated with the "ARLON" plain bearing 64, which has a U-shaped cross section defined by two half rings.

Figure 5:
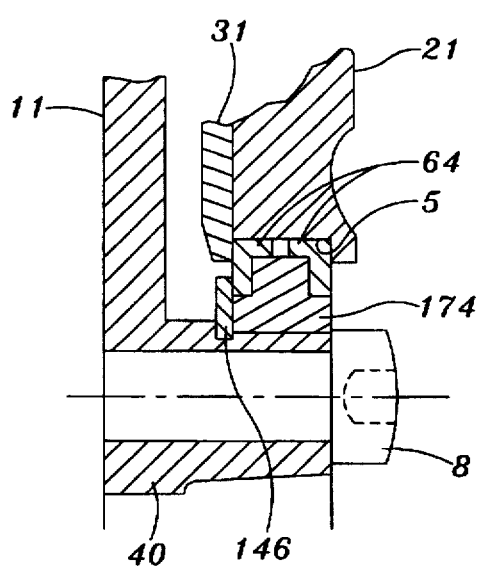

Thus in FIG. 4, the sliding movement takes place on the nose 40, while in FIG. 5 it takes place on the bore 5.

Figure 6:
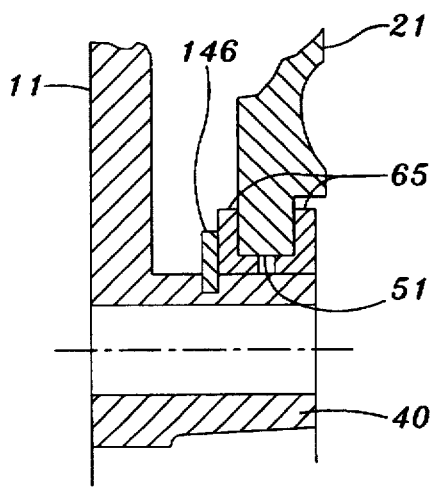

In FIG. 6, the "ARLON" bearing 65 is interposed directly between the nose 4 and the cylindrical central aperture 51 of the reaction plate 21.

This bearing 65, with two half rings, is located axially on the nose 40 in the same way as in FIG. 4.

This arrangement is of particular advantage. In this connection, since the bearing 65 has a small thickness, for a given size of the nose 4, the arrangement is equivalent to a radial extension towards the interior of the plate 21.

By comparison with the embodiment of FIG. 1, the plate 21 is extended by a length which corresponds to the thickness of the ring 71.

Thus, the bore 51 is cooler than the bore 5 in FIG. 5, heat being evacuated at an improved rate due to the increase in radial length towards the inside of the plate 21.

It will also be appreciated that the inner periphery of the plate 21 is simplified. In a modification, having regard to the increase in length of the plate 21, the inner periphery of the said plate 21 and damper plate 1 can be provided with round through holes (not shown), for improving the ventilation of the said plate 1.

Figure 7:
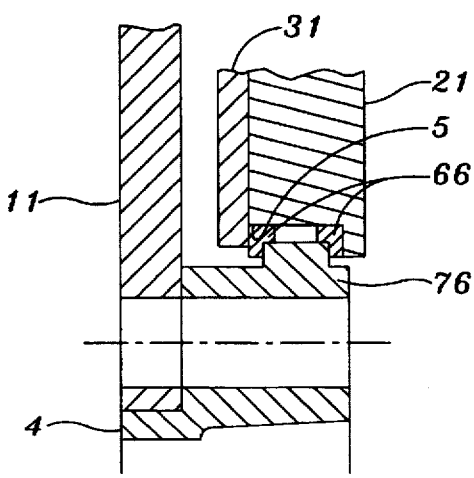

It is of course possible to reverse the structures, and the nose 4 may have a radially projecting crown portion 76 (FIG. 7), replacing the ring 174 of FIG. 5.

The bearing 66 is interposed between the crown portion 76 and the internal bore 5 of the plate 21.

The rings of the "ARLON" bearing 66 are located axially by the damper plate 31 and the plate 21, as in FIG. 5.

The present invention is of course not limited to the embodiments described, In particular, as described in the above mentioned documents FR-A-2 554 891 and U.S. Pat. No. 4,729,465 (FIG. 1), the nose may be fixed to the plate 21 of the second mass 2, and the aperture may be defined by the inner periphery of the plate 21, the thickness of which is preferably increased for this purpose.

Similarly, all possible combinations may be effected, namely, that one of the half rings of FIGS. 4 to 7 may be replaced by an amorphous diamond carbon coating formed on any one of the appropriate components, preferably that having the least mass. The coating 62 in FIG. 3 nay be replaced by a conical "ARLON" ring.

The bearing in accordance with the invention may of course be reinforced with glass, which gives it improved mechanical strength at high temperatures. Such a bearing may be employed at temperatures greater than 260° C., its crystalline melting point being of the order of 360° C.

This bearing accepts high loads, and its crystalline nature enables it to support indefinitely critical loads of 175N/mm$^2$. In addition, it consumes itself, giving off carbon monoxide and carbon dioxide, its spontaneous combustion temperature being 575° C.

Preferably, this bearing may of course be reinforced with carbon fibres, which again give it improved mechanical resistance to rupture at high temperatures.

Lubricating fillers may be added to its composition, for example molybdenum bisulphide or graphite, so as to reduce its coefficient of friction and reduce its wear resistance due to its lubrication.

I claim:

1. A damped flywheel comprising first and second coaxial masses (1, 2) mounted for rotation of one with respect to the other against a torsion damper device (3), with the first mass comprising a central nose projecting axially and penetrating into a central aperture of the second mass, with support means (6) being interposed between the central nose and the central aperture for rotatable mounting of the second mass having the central aperture, wherein the support means (6) comprise at least one plain bearing in the form of a semi-crystalline, hard material of polyetheretherketone for rotary mounting of the second mass having the central aperture on the first mass having the central nose, wherein the central nose (4) has a projection (72) of generally triangular cross section with first and second inclined faces while the central aperture has a cylindrical portion followed by an inclined portion in contact with a first one of the two inclined faces of the projection (72), and in that said support means comprise a ring (73) having a complimentary surface facing toward a second one of the two inclined faces of the projection (72), said ring, on one hand, being subjected to the action of all axially acting resilient means (144) for biassing said ring (73) into contact with said second one of the two inclined faces of said projection, and, on the other hand, being interposed radially between an outer periphery of the nose (4) and an inner periphery of the central aperture of the second mass.

2. A flywheel according to claim 1, wherein a coating of amorphous carbon (62) is interposed between the second one of the two inclined surfaces of the projection (72) and an internal bore (50) constituting the central aperture of the second mass.

* * * * *